US00RE36858E

United States Patent [19]

Pressutti et al.

[11] E Patent Number: Re. 36,858

[45] Reissued Date of Patent: Sep. 12, 2000

[54] LOW-COST HIGHLY AESTHETIC AND DURABLE SHINGLE

[76] Inventors: Joseph E. Pressutti, 2525 W. Sierra Ave.; George E. Conley, 7616 N. Monte Ave., both of Fresno, Calif. 93711; Alvis M. Rawlinson, 2001 San Michael Dr., Carrollton, Tex. 75006

[21] Appl. No.: 08/755,788

[22] Filed: Nov. 22, 1996

Related U.S. Patent Documents

Reissue of:

[64] Patent No.: 5,365,711
Issued: Nov. 22, 1994
Appl. No.: 08/054,410
Filed: Apr. 28, 1993

[51] Int. Cl.[7] ..... E04D 1/30

[52] U.S. Cl. ..... 52/518; 52/528; 52/555; 52/553; 264/131; 264/134

[58] Field of Search ..... 52/518, 553, 519, 52/555, 528; 264/131, 134, 295, 257

[56] References Cited

U.S. PATENT DOCUMENTS

| | | | |
|---|---|---|---|
| 1,410,299 | 3/1922 | Harshberger | 52/518 |
| 1,435,623 | 11/1922 | Saxe | 52/518 X |
| 1,848,965 | 3/1932 | Miller | 52/540 |
| 3,894,376 | 7/1975 | Shearer | 52/518 |
| 3,913,294 | 10/1975 | Freiborg | 52/518 |
| 3,937,640 | 2/1976 | Tajima | 52/518 |
| 4,322,928 | 4/1982 | Freiborg | 52/521 |
| 4,404,783 | 9/1983 | Freiborg | 52/518 |
| 4,464,872 | 8/1984 | Eaton | 52/518 |
| 4,835,929 | 6/1989 | Bondoc | 52/553 |
| 4,920,721 | 5/1990 | Pressutti et al. | 52/518 |
| 4,934,120 | 6/1990 | Boyd | 52/518 |
| 5,247,771 | 9/1993 | Poplin | 52/518 |
| 5,375,388 | 12/1994 | Poplin | 52/560 |

*Primary Examiner*—Beth Aubrey
*Attorney, Agent, or Firm*—Terry L. Miller

[57] ABSTRACT

A ridge cover is formed of inorganic (glass) felt-like sheet material fill-coated with an asphaltic material modified to improve its flexibility. The sheet material is repeatedly back bent upon itself to provide a thickened portion for the ridge cover. The flexible asphaltic material surprisingly allows such back bending of the sheet material substantially without fracture of the glass fibers of the inorganic felt at the bends.

55 Claims, 1 Drawing Sheet

FIG. 1
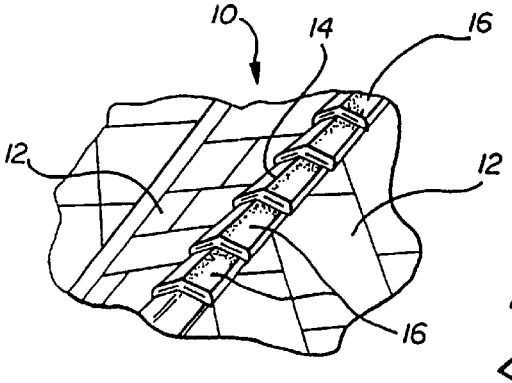
FIG. 2
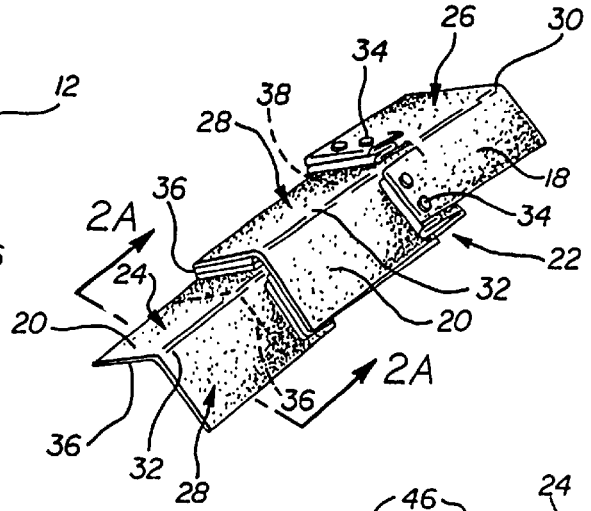
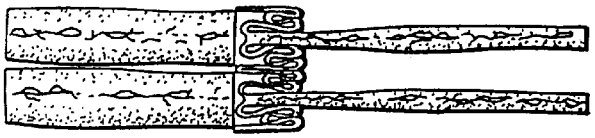
FIG. 3
PRIOR ART
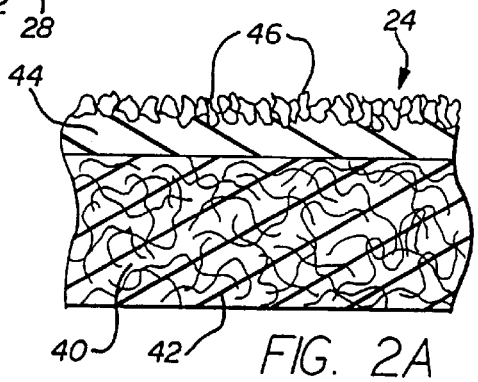
FIG. 2A
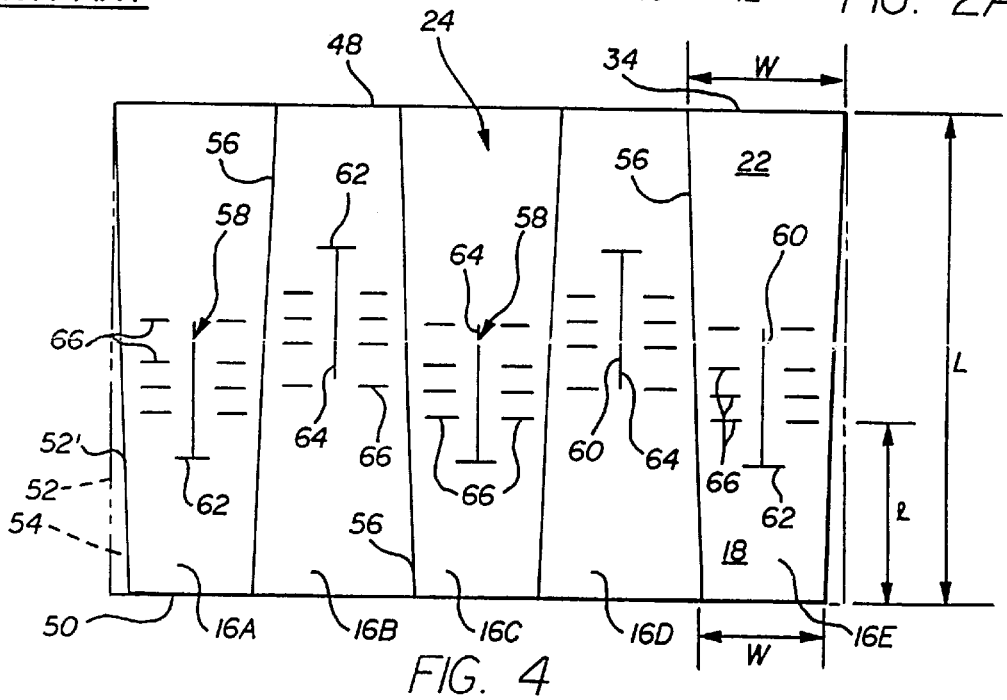
FIG. 4

LOW-COST HIGHLY AESTHETIC AND DURABLE SHINGLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a low-cost, durable and highly aesthetic shingle for roofing. More particularly, the present invention relates to a durable and flexible fiberglass composition shingle for roofing which is particularly configured as a ridge cover for application to the ridges, hips, and rakes of a roof where generally planar sections of the roof surface angularly intersect. Like a comparatively thick wood shake, the configuration of the present shingle gives an appearance of depth and creates shadow lines at adjacent shingles, which appearance of depth and shadows are considered among the principal aesthetically pleasing aspects of a wood shake roof. On the other hand, the present shingle provides fire protection much better than conventional wood shakes, and even better than conventional organic asphalt composition roofing, as well as a lower weight and better durability than the latter.

2. Description of the Related Art

A conventional low-cost organic asphalt composition ridge cover is known in accord with U.S. Pat. No. 3,913,294, issued Oct. 21, 1975 to B. Freiborg. The Freiborg patent is believed to teach a cover for the hips, ridges, and rakes of a roof wherein the cover includes a body of sheet organic filamentary material or organic felt layered first on an outer face with saturant asphalt penetrating somewhat through the felt sheet as well as saturating into the filaments of the felt, and then additionally layered with on outer asphalt layer securing a cosmetic and abrasion-resisting outer coating of granular mineral material.

The ridge cover of Freiborg is configured as an elongate trapezoid having a T-shaped slit extending along its length near the center thereof. Plural transverse score lines transect the upright of the T-shaped slit, and the ridge cover is back folded on itself at these score lines either two times or four times to provide a central thickening in the ridge cover. Primarily because the asphalt material tends to be brittle, especially when cool, the ridge cover of Freiborg while warm during manufacturing is folded lengthwise with the granular material outward. This lengthwise fold both allows shipment of the ridge cover in a compact form, and insures that any bending along the lengthwise fold which occurs in the field preparatory to installation of the cover on a roof is in the direction of unfolding the ridge cover at this lengthwise fold.

Even with these precautions, the shingle of Freiborg is frequently found at a job site and before being unfolded for installation to have been damaged in manufacture, packing, shipping, or handling and to have fissures or cracks in the layered asphaltic material, especially at the lengthwise fold. The layered construction and brittle nature of the asphaltic material apparently combine to result in a somewhat fragile ridge cover which frequently is damaged even before it can be installed on a roof.

These fissures and cracks compromises the weather protection for the organic fibrous mat or felt. Consequently, the shingle of Freiborg frequently has a service life even shorter than would be expected with a view to the materials from which the shingle is made. Of course, fissures which extend all the way through the ridge cover to form cracks therein render the ridge cover worthless. In view of the above, the brittle, fragile nature of the conventional organic composition ridge cover may be appreciated.

While the asphalt material layering the organic felt of Freiborg's ridge cover is strong and provides good strength and rigidity as installed, it is also brittle. That is, the conventional organic asphalt composition shingle provides a layered or non-uniform composition of relatively weak organic fibers, some of which are saturated by and/or embedded in a matrix of relatively strong and stiff, but sometimes brittle, saturant asphalt material. Because the organic asphalt composition material has a very limited tolerance to bending, and this tolerance is better in the unfolding direction than in the opposite direction, the cover of Freiborg may endure the limited unfolding or opening necessary in the field for installation on a roof. However, if ambient temperatures are not high enough, these conventional ridge covers may require that they be warmed in the field before they are opened for installation. Such opening or unfolding in the field, even though it is of a limited nature and is performed in the direction of greatest tolerance to folding, may crack and destroy the ridge cover taught by Freiborg if it is performed at a low temperature.

Despite the shortcomings outlined above, the ridge cover according to the Freiborg patent has been a commercially successful product for many years. However, during this time, inorganic composition roofing materials have been developed which are considerably more flexible, durable and fire resistant than the conventional asphalt composition roofing materials of organic felt layered with asphalt and mineral granules. Specifically, these improved modern roofing materials include a sheet-like mat or felt of inorganic glass fibers with a layer of coating-grade asphaltic material partially impregnating the inorganic felt.

The coating grade asphaltic material cannot saturate into the glass fibers of the felt. However, the asphaltic material does penetrate into and partially through the sheet of inorganic felt. The asphaltic material additionally may be filled, for example, with granite dust or other inert material to improve the resistance of the material to ultraviolet light, or may be filled and modified (or "blown") by a steam and hot air process which modifies the viscosity and melting point temperature of the asphalt. Still alternatively, the asphaltic material may include rubberizers to improve its flexibility and reduce its tendency toward brittle fracture. In each case, however, the inorganic felt is conventionally layered with the asphaltic material and the resulting composition of fibrous material and matrix asphaltic material is not materially uniform throughout its thickness. Like the older roofing materials, an additional layer of asphalt adheres granular material to the outer surface of the roofing material to provide coloration, abrasion, and weather protection.

Importantly, these improved modern roofing materials offer a considerably greater flexibility, durability, and fire protection than conventional organic felt roofing materials. These improved roofing materials provide a composite of inorganic glass fibers which are very strong in tension and have an initial limpness or flexibility, but which will not endure sharp bending. That is, these inorganic glass fibers will fracture if subjected to a sharp bend. The felt of glass fibers is layered with and forms an intermediate composite with a matrix of asphaltic material which itself may be conventionally brittle, or may preferably be modified to be somewhat flexible. Even though the glass fibers are brittle and will fracture if bent sharply, they are somewhat flexible for small deflections and distortions of the shingle, and their very high tensile strength somewhat offsets the brittleness of the asphaltic matrix material.

These modern shingles have an improved tolerance to being walked on, and an improved tolerance to the give and take of a roof. The high-strength glass fibers of the composition tend to support the asphalt material so that it does not as easily crack from its own brittleness. As a result, the manufacturers of these roofing materials have been able to offer considerably longer roofing material warranties, in the range of 20 years, 30 years, or longer. Of course, in view of the high labor costs to re-roof a structure, the comparatively small incremental cost increases of the improved materials, and the risks of damage to structure and contents from water leakage which may result from a failed or worn out roof, these modern long-lived roofing materials have become very popular.

Consequently, fiberglass shingles have been widely adapted for roofing uses. However, the flexibility of fiberglass shingles which contributes to their greater tolerance to being walked on, and to their greater ability to endure the give and take of a building roof with changes in temperature and moisture content of the underlying structure, for example, is not an unmitigated advantage. The greater initial flexibility of fiberglass shingles may contribute to a greater susceptibility to their being caught by wind and being lifted off the roof surface. With conventional flat shingles, this wind susceptibility is generally overcome with the use of an adhesive securing the free end of each shingle to an underlying portion of a shingle below. This underlying portion of the lower shingle is secured to the roof by adjacent roofing nails and retains the upper shingle via the adhesive.

However, should securement of the shingle free end not be sufficient to withstand a high wind, the shingle end will be lifted and may be bent back over the rest of the shingle. In other words, the shingle is bent double on itself. Under these conditions, another unfortunate aspect of fiberglass shingles becomes apparent. When bent back on itself, a shingle creases and forms a sharp angle at the bend. Conventional organic mat or felt shingles with their low strength but flexible organic fibers may endure a very limited amount of this type of abuse and still remain intact. However, the brittle glass filaments in a fiberglass mat or felt fracture quickly when subjected to such a sharp back bend. Consequently, the fiberglass shingle will break at the crease, the free end will separate from the remainder of the shingle, and the shingle will cease to provide weather protection to the underlying roof.

In view of this recognized shortcoming of fiberglass shingle material, ridge covers of the type taught in the Freiborg patent, which require the material to endure sharp back bends during manufacture, have not been made of fiberglass mat or felt. Fiberglass mat layered with conventional or modified asphalt was believed simply not able to withstand the sharp bends necessary to form a ridge cover as taught by Freiborg.

Instead, roofing practice has evolved to the use of fiberglass shingles on the planar portions or fields of a roof, and in some cases, to the additional use of asphalt composition ridge covers of organic felt as taught by Freiborg. Of course, this practice results in a roof system having a durable shingle on the fields and a less durable ridge cover. Consequently, some home owners who believe that they have a roof warranty of 20 or 30 years, or longer, which warranty would apply properly to the field shingles, may discover to their dismay that the shingle manufacturer's warranty is voided by the combination in the roof system of the shorter-lived organic asphalt composition ridge covers. Also, while the field shingles provide an Underwriters Laboratory Class "A" fire protection rating, the conventional ridge covers do not provide any significant level of fire protection. Consequently, the fire protection of the roof system is seriously compromised by the presence of the conventional organic ridge covers.

In order to provide a complete roofing system which includes both inorganic shingles and inorganic ridge covers of equally long durability and fire protection ability, a formed high-profile ridge cover is presented by U.S. Pat. No. 4,920,721, (the '921 patent) issued May 1, 1990 to the co-inventors of the present invention. The '921 patent teaches a high-profile shingle which includes an elongate trapezoidal base of fiberglass mat fill-coated with asphaltic material, and provided with an outer coating of granular mineral. The shingle is provided with at least one lengthwise extending stiffener which helps overcome the initial flexibility of the fiberglass felt material while also resisting back bending of the shingle. A lengthwise generally obtuse bend is formed in the shingle, and a comparatively thick sealing member is provided adjacent the free end of the shingle to space it away from the roof structure or from an underlying shingle.

The base inorganic felt material of the shingle according to the '921 patent has sufficient bend tolerance to allow the formation of the lengthwise bend, which generally forms an obtuse angle, but is otherwise is treated as a stiff structure which is not distorted from its planar configuration. The base material from which this shingle is formed would not conventionally be expected to tolerate the sharp back bends involved in forming a shingle as taught by Freiborg. It may be appreciated that the design of the shingle taught by the '921 patent uses conventional fiberglass shingle material to best advantage, while compensating for its shortcomings.

Unfortunately, a shingle according to the '921 patent is also somewhat expensive to make and ship. That is, both the stiffener and the sealing member represent separate pieces to be formed and united with the remainder of the shingle. Also, the comparatively thick sealing members take up space and to a certain extent prevent the shingles nesting together in a shipping box as might be desired.

SUMMARY OF THE INVENTION

In view of the above, the present invention provides an improved shingle which is particularly configured for its use as a ridge cover. The shingle is formed of a base of fiberglass mat of felt with a fill-coat of impregnating asphaltic material especially modified to make it less brittle. The modified asphaltic material may be considered somewhat rubbery in comparison to the rather brittle asphaltic materials used by Freiborg, for example. The fiberglass felt and asphaltic material are combined in such a way as to provide a composition structure of inorganic glass fibers in an asphaltic matrix which is uniform substantially through the thickness of the ridge cover.

Surprisingly, the Applicants have discovered that the base of fiberglass mat impregnated with a fill-coat of the modified asphaltic material will also tolerate sharp back bending at least as well as or even better than the old organic asphalt composition material. In contrast to the concept of the ridge cover taught by the '721 patent, the Applicants have unexpectedly discovered that a materially uniform composition of inorganic fibers in a modified asphaltic matrix may be folded and sharply bent back on itself in order to form a ridge cover superficially somewhat similar to the old structure of Freiborg.

The Applicants believe that the modified asphaltic material impregnating into the mat of glass fibers surrounds and supports these fibers such that the mat will tolerate sharp bending. The matrix of modified asphaltic material, rather than itself being brittle, is somewhat rubbery and may distribute bending forces in the composite structure of the shingle rather than itself fracturing and concentrating bending forces on the glass fibers. An outer coating of granular mineral material is adhered to the base with an additional layer of the modified asphaltic material.

Consequently, the configuration of the improved shingle superficially appears like that of the old shingle of Freiborg. However, the improved material from which the shingle is fabricated is not layered with brittle asphalt, but is fill-coated or permeated with a modified asphaltic material to provide a composite material which is materially uniform throughout its thickness, and which allows a durability and service life which the shingle of Freiborg could not match.

Additionally, the present improved shingle is configured, shaped, and dimensioned to offset any undesirable consequences which might result from the use of the improved material of construction with a flexible fiberglass mat including the less brittle and more flexible modified asphaltic material. The resulting shingle, rather than being brittle at particular temperatures as is a conventional asphalt composition shingle, is comparatively flexible. Because the fibrous mat of the improved shingle tends toward initial flexibility, like other fiberglass shingles, and the impregnating layer of modified asphaltic material is also more flexible and less brittle than conventional asphalt material, the resulting shingle may be considerably more flexible than conventional asphalt composition shingles at any particular temperature.

In order to offset the possible undesirable effects of the improved flexibility of the shingle, such as a possibly increased susceptibility to wind lifting, the improved shingle is configured with a decreased length and increased width. Consequently, the free end of the shingle does not extend as far from the nailed portion of the shingle and a decreased susceptibility to wind lifting results.

Also, because of the surprising flexibility and improved tolerance to sharp or back bending of the material from which the present ridge cover is made, a manufacturing step necessary with conventional materials, that of forming score lines in the sheet composition material preparatory to formation of the back bends therein, may be omitted for a further cost saving.

Additional objects and advantages may be appreciated from a reading of the following detailed description of a single exemplary and preferred embodiment of the invention taken in conjunction with the following drawing Figures, in which:

DESCRIPTION OF THE DRAWINGS

FIG. 1 provides a fragmentary perspective view of a shingle embodying the present invention installed on a roof;

FIG. 2 is an enlarged fragmentary perspective view of the shingle seen in FIG. 1;

FIG. 2A is a fragmentary cross sectional view taken along line 2A—2A of FIG. 2 and viewed in the direction of the arrows;

FIG. 3 provides a plan view of a pair of conventional shingles as they are generally disposed adjacent one another during shipping, and illustrating the nature and extent of fissuring and cracking sometimes encountered with the conventional shingles; and FIG. 4 provides a plan view of a sheet of shingle material at an intermediate stage of manufacture.

DESCRIPTION OF A PREFERRED EMBODIMENT OF THE INVENTION

Viewing FIG. 1, a roof 10 is seen to include a pair of generally planar and conventional shingle-covered inclined surfaces or fields 12, which intersect with one another at an inclined hip 14. At the hip 14, the roof 10 includes a plurality of aligned and partially overlapping ridge cover members 16. Those ordinarily skilled in the pertinent arts will appreciate that the same type of ridge cover member 16 employed at the hip 14 may be used also at the ridges and rakes (not shown) of the roof 10.

As is more particularly shown in FIG. 2, the ridge cover members 16 each include a chevron-shaped sheet-like upper portion 18 and a similar chevron-shaped sheet-like lower portion 20, which portions are connected by a thickened portion 22. The thickened portion 22 is thickened by repeated back folding of the sheet material, generally referenced with the numeral 24, from which the ridge cover 16 is formed. Because this sheet material 24 is generally in the range of from one-eight to three-sixteenth of an inch thick, and the thickened portion 22 is formed by back folding the material 24 either twice or four times on itself, the portions 18 and 20 define respective upper surfaces 26, and 28 which are spaced apart perpendicularly to the plane of the sheet material 24 by twice or four times the thickness of the sheet material 24. That is, the upper surfaces 26, and 28 are spaced out of plane with each other by a dimension preferably in the range of from one-forth to three-forth of an inch. Also, the upper portion 18 and lower portion 20 define respective longitudinal fold lines 30 and 32 which are similarly spaced apart from each other in a direction perpendicular to the fold lines.

On the roof 10 successive ridge cover members are installed upwardly along the hip 14 by nailing through the thickened portion 22 as is shown with the exposed nail heads 34 on one ridge cover, or alternatively, by nailing above the thickened portion 22 through the lower part of the portion 18. Each ridge cover 16 is installed with the lower portion 20 of each overlapping the upper portion 18 of the preceding ridge cover member to cover the nail heads exposed on this preceding cover member. In fact a lower end edge 36 of each successive ridge cover member 16 extends slightly downslope beyond the thickened portion 22 of the preceding ridge cover member. Consequently, the ridge covers 16 as installed on roof 10, provide a shadow, referenced on the drawing Figures with the numeral 38, falling on the lower portion 20 of the next lower ridge cover member. Those ordinarily skilled in the pertinent arts will recognize that the existence and extent of the shadow 38 depends on the ambient lighting conditions, and that this shadow generally will be similar aesthetically to that at a hip of a wood shake roof.

Viewing particularly FIG. 2A, a cross sectional view of one of the ridge covers 16 is provided. Each ridge cover 16 includes a felt or mat 40 of entangled fine-dimension inorganic glass fibers 40. Encompassing these glass fibers 40 is a fill-coating or impregnating mass of modified, or filled and modified asphaltic material referenced with the numeral 42. The material surrounds and bonds to the fibers 40 and forms a three dimensional matrix having a depth generally equal the thickness of the felt 40. On an upper or outer surface of the felt/matrix (40/42), is disposed a comparatively thin layer of additional modified asphaltic material 44, which secures a layer of protective granular mineral material 46 thereto.

Particularly, the modified or filled and modified asphaltic material 42 is composed of asphalt having at least three percent of a flexibility-improving elastomeric material added thereto. According to the exemplary preferred embodiment of the invention, the flexibility-improving additive is styrene-butadiene-styrene (SBS) added to the asphalt at a seven percent by weight ratio. The asphalt and SBS are combined in a high-power high-shear mixer/blender, and masticated with one another at a temperature of from 350 to 360 degrees F. While the seven percent loading of SBS has been found in actual practice of the present invention to give satisfactory results, the percentage of SBS may be increased up to about twelve percent, if desired.

After being so modified to improve its flexibility, the asphaltic material 42 in forcefully impregnated into the felt 40 of glass fibers. A subsequent operation applies the layer 44 of additional asphaltic material and embeds the granular mineral material 46 in this layer while still hot. [A sheet roofing material conforming to the above specification is available from Herbert Malarkey Roofing Company, 3131 North Columbia Avenue, Portland, Oreg.]

Alternatively, another flexibility improving additive may be employed in the practice of the present invention. An alternative flexibility improving additive which is known to the Applicants is atactic polypropylene. This material may be added to natural asphalt in about the same percentages indicated above (i.e., three percent to twelve percent by weight), and will give good results, the Applicants believe.

Viewing FIG. 4, a sheet of the material 24 is shown in plan view at an intermediate step of the manufacture of the ridge cover 16. This sheet initially is planar and rectangular with upper and lower parallel edges 48 and 50, and parallel side edges 52. During manufacturing of the ridge cover 16, a triangular portion 54 of the sheet material 24 is trimmed away at each side to create new relatively angulated side edges 52'. Consequently, the sheet of material acquires a trapezoidal shape like the ridge covers 16. Between the new side edges 52', the sheet material 24 is slit to form successively oppositely angulated separation lines 56.

Between the separation lines 56, the sheet material 24 defines plural oppositely-disposed work pieces (in the present case, five work pieces, although a different number of work pieces is equally possible) respectively referenced with the numerals 16*a*, 16*b*, 16*c*, 16*d*, and 16*e*. Each of these work pieces becomes one ridge cover member 16 upon completion of the manufacturing process. As seen in FIG. 4, the work pieces 16*a*–16*e* are each of elongate trapezoidal shape. These work pieces 16*a*–16*e* have a length "L" in the range of from 21 and ¾ inch to 24 and ¼ inch. At its narrow end each work piece 16*a*–16*e* has a width "w" of from 5 inches to 8 inches, and this narrow end of the work piece which will form the upper portion 18 of the finished ridge cover has a length "l" of from 6 inches to 9 inches. At its wider end, each work piece has a width "W" of from 7 and ¾ inches to 9 and ¾ inches wide. In each work piece, a length-wise extending centrally located T-shaped slit 58 is formed. The T-shaped slits each include an upright portion of the T-shape, referenced with the numeral 60 which is from 5 and ⅝ inches to 7 and ⅝ inches long, and a cross bar portion of the T-shape which is referenced with the numeral 62. An end 64 of the upright portion 60 away from the cross bar portion 62 defines one margin for the thickened portion 22, as will be seen.

On each side of the upright portion 60 of the T-shaped slit 58, the work pieces 16*a*–16*e* each include plural spaced apart transverse score lines 66 which are aligned with one another in pairs on opposite sides of the upright portion 60. One pair of the score lines 66 are aligned with the end 64 of the upright portion 60 of the T-shaped slit 58. After the work pieces are separated from one another at the separation lines 56, each is back folded on itself at the score lines 66 to create the thickened portion 22. In other words, and by way of example, the work pieces may be first folded double at the pair of score 66 lines aligning with the end 64 of the upright portion 60 with their upper surfaces together, and then be successively back folded in opposite directions at each successively adjacent pair of score lines.

Although the present ridge cover members are depicted and described with the score lines 66 in order to clarify the formation of the ridge covers from the sheet material as depicted in FIG. 4, the Applicants have discovered that the remarkable and surprising flexibility and tolerance to back bending which is possessed by the present material of construction allows the ridge covers 16 to be formed without the score lines 58. While the work pieces are still back folded at each location indicated by the score lines, the actual formation of these score lines as a step in the manufacture of the ridge covers may be omitted. This elimination of the necessity to form the score lines 66 additionally reduces the costs of manufacture for the present ridge covers.

After the successive back folds are formed in a work piece to create the thickened portion 22, the work piece is folded in half lengthwise on itself with its upper surface outwardly. During this lengthwise folding, the thickened portion 22 separates on each side of upright portion 60 of the slit 58, and the fold liens 30 and 32 move generally into alignment with one another to create a form generally like the one seen in FIG. 3. While FIG. 3 depicts the prior art ridge cover according to the Freiborg patent, it also illustrates the type and extend of cracking and fissuring which may be found in ridge covers made according to the conventional teaching of Freiborg. This type of cracking and fissuring may be present even before the covers are unfolded for their installation on a roof. Understandably, such cracked and fissured ridge covers may not be useable at all, or can not be expected to give a very long service life if they are used.

In contrast to the ridge covers of Freiborg, while the present ridge covers superficially appear similar structurally, they are considerably and surprisingly different so far as their structure, material uniformity through the thickness of the ridge cover, service life, durability, and fire protection are concerned. The present ridge covers are also particularly dimensioned differently than the conventional ridge covers to compensate for the greater flexibility of the ridge covers, and achieve a secure and wind-resistant installation on a roof.

The surprising flexibility of the described material of construction also allows the present ridge covers to endure the sharp lengthwise bend which places them in to condition for compact shipment without the fissuring and cracking experienced with conventional ridge covers. Also, the preheating of the conventional ridge covers which has been necessary before they would endure unfolding to their installation condition is reduced or eliminated by the present invention. As a result, the sometimes heavy rate of damage in shipping, handling, and preparations for installation which was experienced with conventional ridge covers is drastically reduced by the present invention. Thus, yet another saving is realized out of this present invention, the lost expenses of shipping and handling damage-prone conventional ridge covers which because they are found to have been damaged prior to their installation on a roof are not suitable for installation at all.

Also, and understandably, the inclination in the field while installing a roof is to make best use of the materials at hand. Thus, when conventional ridge covers are found to be a little damaged they are frequently installed nonetheless. This inclination to use marginal materials, to compromise the integrity of the roof system as installed, and to perhaps further undermine the roof warranty of a home owner is decreased by the present invention. That is the present flexible ridge covers are not nearly so susceptible to damage in shipping and handling as are the conventional brittle ridge covers. Consequently, roofers in the field are provided with a flexible ridge cover not damaged in shipping and requiring less special care and handling in installation. The resulting integrity of the installed roof system is much improved. Home owners may enjoy the full 20 year, 30 year, or longer, warranty of their roof system, as well as an improved [Class "A",] fire rating for the entire roof.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, the sheet like base of inorganic fibers could be woven rather than felted. While such a woven base material is not generally used in the roofing art because of its cost, it would provide a much stronger shingle and the invention could be practiced using such a base material. Also, other elastomeric polymers could be used in modifying asphaltic material to improve its flexibility. The two flexibility improving additives mentioned herein are exemplary only. Thus, clearly the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A ridge cover for roofing, said ridge cover comprising:

an elongate sheet of flexible and durable composition roofing material which is substantially uniform through its thickness, said sheet including a sheet-like base of felted inorganic fibers through impregnated with a modified asphaltic matrix material, said modified asphaltic matrix material including asphalt and at least three percent by weight of a flexibility improving additive selected from the group including styrene-butadiene-styrene, and atactic polypropylene;

said ridge cover further including on a top side thereof a coating of said modified asphaltic material adhering thereto an upper layer of granular mineral material;

said elongate sheet of composite roofing material being transversely back folded on itself at least twice at spaced apart fold lines intermediate the length of said sheet to define a transverse comparatively thickened portion for said ridge cover, and said modified asphaltic matrix material distributing folding stresses within said back folds to prevent fracture of said sheet-like base of felted inorganic fibers, said transverse thickened portion connecting comparatively thinner and elongate respective upper and lower portions of said cover member disposed on each side thereof;

said elongate sheet further including a T-shaped through slit at said thickened portion and extending into an adjacent part said upper portion of said cover member, said sheet being folded lengthwise on itself with said upper layer of granular material outwardly to a shipping position in which said upper and lower portions define respective longitudinal fold lines, and said T-shaped slit opening to allow said transverse thickened portion to also fold and to be sandwiched within said adjacent part of said upper portion, said modified asphaltic matrix material also distributing folding stresses at said longitudinal fold lines to prevent fracture of said sheet-like base of felted inorganic fibers.

2. The ridge cover of claim 1 wherein said flexibility improving additive is included in said modified asphaltic material at a weight percentage of from about three percent to about [ten] *twelve* percent.

3. The ridge cover of claim 2 wherein said flexibility improving additive is included in said modified asphaltic material at a weight percentage of substantially seven percent.

4. The ridge cover of claim 1 wherein said elongate sheet is of trapezoidal shape.

5. The ridge cover of claim 4 wherein said trapezoidal shape has a length of from about 21¾ inches to about 24¼ inches.

6. The ridge cover of claim 5 wherein said trapezoidal shape has a wider end edge of from about 7¾ inch to about 9¾ inch, and a narrower end edge of from about 5 inches to about 8 inches.

7. The ridge cover of claim 6 wherein said comparatively thinner and elongate lower portion has a length from said wider end edge to said thickened portion of from about 6 inches to about 9 inches.

8. The ridge cover of claim 7 wherein said T-shaped slit has a length of from about 5⅝ inches to about 7⅝ inches.

9. As an article of manufacture, a ridge cover for roofing which at an intermediate stage of manufacture comprises an elongate trapezoidally-shaped sheet of composition roofing material, said roofing material sheet including a base sheet with a sheet-like felt of inorganic fibers in a matrix of modified asphaltic material and being materially uniform throughout its thickness, said modified asphaltic material including asphalt and a flexibility improving additive selected from the group including styrene-butadiene-styrene and atactic polypropylene, said flexibility improving additive being added to said asphalt at a weight percentage of from about three percent to about ten percent, and said article including a T-shaped longitudinal slit having a cross bar portion disposed toward a narrower end of said trapezoidal shape.

10. The article of manufacture of claim 9 wherein said trapezoidally-shaped sheet is free of transverse score lines aligned transversely to an upright portion of said T-shaped slit as preparations for back folding of said article on itself.

11. The article of manufacture of claim 9 wherein said trapezoidal-shaped sheet has a length of from about [21¼] *21¾* inches to about 24¼ inches.

12. The article of manufacture of claim 9 wherein said trapezoidally-shaped sheet has a wider end edge of from about 7¾ inches to about 9¾ inches wide.

13. The article of manufacture of claim 12 wherein said trapezoidally-shaped sheet has a narrower end edge of from about 5 inches to about 8 inches wide.

14. The article of manufacture of claim 13 wherein said T-shaped slit has a length of from about 6 inches to about 9 inches.

15. A method of providing an inorganic composition ridge cover for roofing, said method comprising the steps of:

providing a felt-like sheet of inorganic fibrous material;

providing a modified asphaltic material including asphalt and a flexibility improving additive;

selecting said flexibility improving additive from the group including styrene-butadiene-styrene and atactic polypropylene;

adding said flexibility improving additive to said asphalt at a weight percentage of from about three percent to about ten percent;

employing a high-shear [mixer] *mixer/blender* to combine said asphalt and said flexibility improving additive;

fill coating said felt-like sheet of inorganic fibrous material with said asphaltic material to provide a materially uniform base sheet for said ridge cover;

back bending said base sheet on itself to provide a thickened region in said ridge cover; and while back bending said base sheet on itself employing said asphaltic material to distribute bending forces in said materially uniform base sheet and substantially preventing fracture of the inorganic fibers of said felt-like sheet at said back bend.

16. The method of claim 15 wherein said selecting step includes the selection of said styrene-butadiene-styrene.

17. The method of claim 15 wherein said adding step includes the addition of said flexibility improving additive at substantially seven percent by weight to said asphalt.

18. The method of claim 15 wherein said combining of said flexibility improving additive and said asphalt with said high sheer [mixer] *mixer/blender* further includes the step of heating the materials during combination to about 350° F.

19. The method of claim 15 further including the steps of providing an outer layer of said modified asphaltic material on said base sheet, and employing said outer layer to adhere a granular mineral material on said ridge cover.

20. The method of claim 19 further including the steps of cutting a portion of said base sheet with said outer layer of asphaltic material and outer layer of granular material thereon to an elongate trapezoidal shape, forming a longitudinally extending T-shaped slit in said trapezoidally shaped portion, and repeatedly back bending said sheet portion on itself intermediate its length and at bend lines transverse to said T-shaped slit without formation of preparatory score lines at said bend lines to provide said thickened portion in said ridge cover.

21. A ridge cover for roofing, said ridge cover comprising:

an elongate sheet of flexible and durable composition roofing material which is substantially uniform through its thickness, said sheet including a permeable sheet-like base of inorganic fibers through impregnated with a modified asphaltic matrix material, said modified asphaltic matrix material including asphalt and at least three percent by weight of a flexibility improving additive;

said ridge cover further including on a top side thereof a coating of said modified asphaltic material adhering thereto an upper layer of granular mineral material;

said elongate sheet of composite roofing material being transversely back folded on itself at least twice at spaced apart fold lines intermediate the length of said sheet to define a transverse comparatively thickened portion for said ridge cover, and said modified asphaltic matrix material distributing folding stresses within said back folds to prevent fracture of said sheet-like base of inorganic fibers, said transverse thickened portion connecting comparatively thinner and elongate respective upper and lower portions of said cover member disposed on each side thereof;

said elongate sheet further including a T-shaped through slit at said thickened portion and extending into an adjacent part said upper portion of said cover member, said sheet being folded lengthwise on itself with said upper layer of granular material outwardly to a shipping position in which said upper and lower portions define respective longitudinal fold lines, and said T-shaped slit opening to allow said transverse thickened portion to also fold and to be sandwiched within said adjacent part of said upper portion, said modified asphaltic matrix material also distributing folding stresses at said longitudinal fold lines to prevent fracture of said sheet-like base of inorganic fibers.

22. The ridge cover of claim 21 wherein said flexibility improving additive is an elastomeric polymer.

23. The ridge cover of claim 22 wherein said flexibility improving additive is selected from the group including styrene-butadiene-styrene, and atactic polypropylene.

24. The ridge cover of claim 21 wherein said sheet-like base of inorganic fibers is felted material.

25. The ridge cover of claim 21 wherein said sheet-like base of inorganic fibers is woven material.

*26. A ridge cover for roofing, said ridge cover comprising:*

*a sheet of flexible composition roofing material which is substantially uniform through its thickness, said sheet including a permeable sheet-like base of felted inorganic fibers through impregnated with a modified asphaltic matrix material, said modified asphaltic matrix material including asphalt and at least three percent by weight of a flexibility improving additive selected from the group consisting of: styrene-butadiene-styrene, and atactic polypropylene;*

*said ridge cover further including on a top side thereof a coating of said modified asphaltic material, said coating of modified asphaltic material adhering an upper layer of granular mineral material;*

*said sheet of composite roofing material being back folded on itself, and said modified asphaltic matrix material distributing folding stresses within said back folds to prevent fracture of said sheet-like base of felted inorganic fibers.*

*27. The ridge cover of claim 26 wherein said flexibility improving additive is included in said modified asphaltic material at a weight percentage of from about three percent to about twelve percent.*

*28. The ridge cover of claim 26 wherein said flexibility improving additive is included in said modified asphaltic material at a weight percentage of substantially seven percent.*

*29. A method of providing an inorganic composition ridge cover for roofing, said method comprising the steps of:*

*providing a felt-like sheet of inorganic fibrous material;*

*providing a modified asphaltic material including asphalt and a flexibility improving additive;*

*selecting said flexibility improving additive from the group consisting of: styrene-butadiene-styrene and atactic polypropylene;*

*adding said flexibility improving additive to said asphalt at a weight percentage of from about three percent to about ten percent;*

*mixing together said asphalt and said flexibility improving additive;*

*fill coating said felt-like sheet of inorganic fibrous material with said modified asphaltic material to provide a materially uniform base sheet for said ridge cover;*

*back bending said base sheet on itself; and*

*while back bending said base sheet on itself employing said modified asphaltic material to distribute bending forces in said materially uniform base sheet and to substantially prevent fracturing of the inorganic fibers of said felt-like sheet at said back bend.*

*30. The method of claim 29 wherein said selecting step includes the step of selecting styrene-butadiene-styrene as said flexibility improving additive.*

*31. The method of claim 29 further including the steps of providing an outer layer of said modified asphaltic material on said base sheet, and employing said outer layer of modified asphaltic material to adhere a layer of granular mineral material on said ridge cover.*

*32. A ridge cover for roofing, said ridge cover comprising:*

*a sheet of flexible and durable composition roofing material which is substantially uniform through its thickness, said sheet including a permeable sheet-like base of inorganic fibers through impregnated with a modified asphaltic matrix material, said modified asphaltic matrix material including asphalt and at least three percent by weight of a flexibility improving additive;*

*said ridge cover further including on a top side thereof a coating of said modified asphaltic material adhering thereto an upper layer of granular mineral material;*

*said sheet of composite roofing material being back folded on itself to form a fold line, and said modified asphaltic matrix material distributing folding stresses within said back fold to prevent fracture of said sheet-like base of inorganic fibers.*

*33. The ridge cover of claim 32 wherein said flexibility improving additive is an elastomeric polymer.*

*34. The ridge cover of claim 32 wherein said flexibility improving additive is selected from the group consisting of: styrene-butadiene-styrene, and atactic polypropylene.*

*35. The ridge cover of claim 32 wherein said sheet-like base of inorganic fibers is felted material.*

*36. The ridge cover of claim 32 wherein said sheet-like base of inorganic fibers is woven material.*

*37. The ridge cover of claim 32 wherein said inorganic fibers of said sheet-like base are glass fibers.*

*38. A ridge cover for roofing, said ridge cover being formed of sheet inorganic asphaltic composition roofing material which is back folded on itself to provide in increased thickness and an appearance of thickness for the ridge cover as installed on a roof, said ridge cover comprising:*

*a sheet of flexible inorganic asphaltic composition roofing material which is substantially uniform through its thickness, said sheet including a sheet-like base of felted inorganic fibers through impregnated with a modified asphaltic matrix material, said modified asphaltic matrix material including asphalt and at least three percent by weight of a flexibility improving additive selected from the group consisting of: styrene-butadiene-styrene, and atactic polypropylene;*

*said ridge cover further including on a top side thereof a coating of said modified asphaltic matrix material, said coating of modified asphaltic matrix material adhering an upper layer of granular mineral material;*

*said sheet of inorganic asphaltic composition roofing material being back folded on itself to form a thickening in said ridge cover, and said modified asphaltic matrix material distributing folding stresses within said back fold to prevent fracture of said sheet-like base of felted inorganic fibers.*

*39. The ridge cover of claim 26 wherein said flexibility improving additive is included in said modified asphaltic matrix material at a weight percentage of from about three percent to about twelve percent.*

*40. The ridge cover of claim 26 wherein said flexibility improving additive is included in said modified asphaltic matrix material at a weight percentage of substantially seven percent.*

*41. A ridge cover for roofing, said ridge cover comprising:*

*a sheet of flexible composition roofing material which is substantially uniform through its thickness, said sheet including a sheet-like base of felted inorganic fibers through impregnated with a modified asphaltic matrix material, said modified asphaltic matrix material including asphalt and a flexibility improving additive;*

*said sheet of composite roofing material being back folded on itself, and said modified asphaltic matrix material distributing folding stresses within said back fold;*

*wherein said flexibility improving additive is included in said modified asphaltic material at a weight percentage of at least three about percent.*

*42. The ridge cover of claim 41 wherein said sheet further includes on a top side there of a coating of said modified asphaltic material, said coating of modified asphaltic material adhering an upper layer of granular mineral material.*

*43. The ridge cover of claim 41 wherein said flexibility improving additive is included in said modified asphaltic material at a weight percentage of from about three percent to about twelve percent.*

*44. The ridge cover of claim 41 wherein said flexibility improving additive is selected from the group consisting of: styrene-butadiene-styrene, and atactic polypropylene.*

*45. The ridge cover of claim 41 wherein said sheet is back folded on itself at least twice.*

*46. A method of providing an inorganic composition ridge cover for roofing, said method comprising the steps of:*

*providing a felt-like base sheet of inorganic fibrous material through impregnated with a modified asphaltic material including asphalt and a flexibility improving additive;*

*providing said flexibility improving additive in said modified asphaltic material at a weight percentage of at least three percent;*

*back bending said base sheet on itself;*

*wherein, while back bending said base sheet on itself said modified asphaltic material distributes bending forces in said base sheet.*

*47. The method of claim 46 wherein said selecting step includes the step of selecting styrene-butadiene-styrene as said flexibility improving additive.*

*48. The method of claim 46 wherein said selecting step includes the step of selecting atactic polypropylene as said flexibility improving additive.*

*49. A ridge cover for roofing, said ridge cover comprising:*

*a sheet of flexible and durable composition roofing material which is substantially uniform through its thickness, said sheet including a permeable sheet-like base of inorganic fibers through impregnated with a*

*modified asphaltic matrix material, said modified asphaltic matrix material including asphalt and a flexibility improving additive which is present in said modified asphaltic matrix material at a weight percentage of at least about three percent;*

*said sheet of composition roofing material being back folded on itself to form a fold line, and said modified asphaltic matrix material distributing folding stresses within said back fold so as to substantially prevent fracturing of the fibers of said sheet-like base of inorganic fibers.*

*50. A ridge cover for roofing, said ridge cover being formed of sheet inorganic asphaltic composition roofing material which is back folded on itself to provide an increased thickness and an appearance of thickness for the ridge cover as installed on a roof, said ridge cover comprising:*

*a sheet of flexible inorganic asphaltic composition roofing material which is substantially uniform through its thickness, said sheet including a sheet-like base of felted inorganic fibers through impregnated with a modified asphaltic matrix material, said modified asphaltic matrix material including asphalt and a flexibility improving additive which is present at a weight percentage of at least about three percent, and;*

*said sheet of inorganic asphaltic composite roofing material being back folded on itself to form a thickening in said ridge cover, and said modified asphaltic matrix material distributing folding stresses within said back fold so as to substantially reduce fracturing of said inorganic fibers of said sheet-like base.*

*51. As an article of manufacture, a ridge cover for roofing which at an intermediate stage of manufacture comprises an elongate trapezoidally-shaped sheet of composition roofing material, said roofing material sheet including a base sheet with a sheet-like felt of inorganic fibers in a matrix of modified asphaltic material and being materially uniform throughout its thickness, said modified asphaltic material including asphalt and a flexibility improving additive which is present at a weight percentage of at least about three percent.*

*52. The article of manufacture of claim 53 wherein said flexibility improving additive is selected from the group consisting of: styrene-butadiene-styrene and atactic polypropylene.*

*53. As an article of manufacture, a ridge cover for roofing which at an intermediate stage of manufacture comprises an elongate trapezoidally-shaped sheet of composition roofing material, said roofing material sheet including a base sheet with a sheet-like felt of inorganic fibers in a matrix of modified asphaltic material and being materially uniform throughout its thickness, said modified asphaltic material including asphalt and a flexibility improving additive;*

*wherein said flexibility improving additive is added to said asphalt at a weight percentage of from about three percent to about ten percent.*

*54. The article of manufacture of claim 53 wherein said article includes a T-shaped longitudinal slit having a cross bar portion disposed toward a narrower end of said trapezoidal shape.*

*55. In a ridge cover for roofing which comprises a back folded sheet of composition roofing material, the improvement wherein said material comprises a sheet of felted inorganic fibers through impregnated with a modified asphaltic material including a flexibility improving additive which is present at a weight percentage of at least about three percent.*

* * * * *